(12) United States Patent
Koganezawa (10) Patent No.: US 6,697,211 B2
(45) Date of Patent: Feb. 24, 2004

(54) MAGNETIC HEAD DRIVE DEVICE

(75) Inventor: Shinji Koganezawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 09/814,751

(22) Filed: Mar. 23, 2001

(65) Prior Publication Data

US 2002/0027741 A1 Mar. 7, 2002

(30) Foreign Application Priority Data

Sep. 5, 2000 (JP) ........................................ 2000-268772

(51) Int. Cl.$^7$ ................................................ G11B 5/584
(52) U.S. Cl. ............................... 360/78.12; 360/78.05; 360/75; 360/78.09
(58) Field of Search ................................ 360/75, 78.12, 360/78.05, 78.09, 294.5, 294.6; 369/32, 44.28, 44.11; 318/568

(56) References Cited

U.S. PATENT DOCUMENTS 5,745,319 A * 4/1998 Takekado et al. ........ 360/78.05
5,856,896 A * 1/1999 Berg et al. ................ 360/245.3
5,959,808 A * 9/1999 Fan et al. .................. 360/294.3
6,483,659 B1 * 11/2002 Kobayashi et al. ...... 360/78.04

FOREIGN PATENT DOCUMENTS

JP  9-161425  6/1997
JP  11-31368  2/1999

* cited by examiner

Primary Examiner—David Hudspeth
Assistant Examiner—K. Wong
(74) Attorney, Agent, or Firm—Arent Fox Kintner Plotkin & Kahn

(57) ABSTRACT

A head drive device for positioning a read and/or write head for reading and/or writing information to and from a disk coated with a recording medium, the head drive device including a carriage, a main actuator for moving the carriage, a plurality of heads for reading and/or writing information to and from the disk, and a vibration control portion comprising a plurality of micro-actuators positioned between the carriage and the heads, such that when the main actuator and a first micro-actuator are driven to enable precise positioning of a desired head with respect to a surface of the disk a second micro-actuator is driven so as to offset vibrations generated at the carriage by the operation of the desired micro-actuator.

11 Claims, 12 Drawing Sheets

MAGNETIC HEAD DRIVE DEVICE

BACKGROUND OF THE INVENTION

1. Field of the Invention

The present invention relates to a drive device for a read and/or write head that uses a micro-actuator, and more particularly, to a magnetic head drive device mounted at a tip of an arm in a drive unit for a magnetic disk or other recording media that eliminates vibration at the arm generated when the micro-actuator is driven, thus permitting precise positioning of the head relative to a desired track on a surface of the magnetic disk.

2. Description of Related Art

In recent years, as the density of recorded information increases, demand has arisen for an actuator arm that can be precisely positioned over extremely short ranges. The demand for precisely positionable dead drive devices is particularly great for head actuators mounted in optical focus correction and tilt control systems, printer devices, magnetic disk drives and the like.

Of these information processing devices, the disk drive units that drive magnetic and other rotating recording media are a key component of the multimedia devices that continue to gain added popularity. Multimedia devices, in order to process more video and audio data at faster speeds, continue to rely on development of higher-capacity equipment. Faster disk drive units, for example, have generally been obtained by increasing the per-disk recording density. However, increasing the recording density without changing the diameter of the disk necessitates increasing the number of tracks per inch, or TPI (as measured along the radius of the disk), that is, the width of the tracks must be narrowed. Additionally, increasing the recording density narrows the track pitch, which in turn requires a head actuator capable of precisely positioning the read/write head (hereinafter referred to as the head) with respect to the recording track.

As a device intended to improve the precision with which the head is positioned, a so-called dual actuator-type head drive device has recently been proposed, which combines a micro-actuator for precise movement of the load arm, slider or head with the conventional head actuator.

For example, the present applicant has previously proposed a micro-actuator for a dual actuator-type assembly employing the shear deflection characteristic of a piezoelectric element. See Japanese Laid-Open Patent Application No. 11-31368. Separately and in addition thereto, a number of piezoelectric and electrostatic head drive devices employing micro-actuators have been proposed.

In general, there are three main types of micro-actuators, depending on the object to be driven, namely head suspension drive, slider drive, and head element.

Here, the slider drive and head element types of micro-actuators require a high degree of precise dimensional machining and have high production costs, both reasons that make the use of the head suspension-drive type of micro-actuator desirable. For these reasons as well, the applicant's previous submission, Japanese Laid-Open Patent Application No. 11-31368, also had to do with a head suspension type drive mechanism.

It should be noted that the head suspension referenced here comprises a main arm and an elastic sub-arm that is attached to a tip of the main arm, with the head fixedly mounted to the free remaining end of the sub-arm. The head suspension drive type of head movement mechanism disposes a micro-actuator that undergoes a slight displacement between the main arm and the head suspension, so the head (which is at the tip of the head suspension) can be positioned with a high degree of precision.

FIGS. 1A, 1B and FIGS. 2A, 2B are diagrams illustrating a head drive device employing a conventional suspension drive arrangement.

Figure 1A:
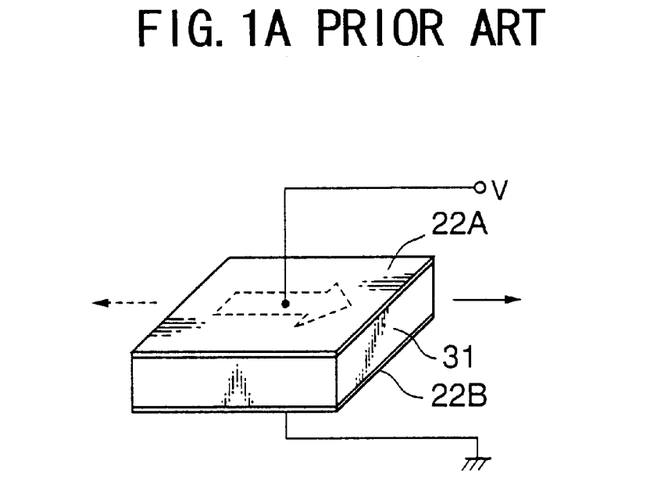
FIGS. 1A and 1B are diagrams illustrating a head drive device employing a conventional suspension drive.

FIGS. 1A, 1B and FIGS. 2A, 2B show an example in which a piezoelectric element is used for the micro-actuator, in particular the shear deflection of the piezoelectric element. The principle of shear deflection is illustrated in FIG. 1A, in which a piezoelectric element 31 is polarized in a direction perpendicular to a direction of a thickness of the piezoelectric element 31 (the direction of polarization indicated by the blank dotted arrow) and electrodes 22A, 22B are mounted on top and bottom surfaces, with the electrode 22B grounded and a voltage V supplied to the electrode 22A. In such an arrangement, the piezoelectric element 31 undergoes a shear deflection.

Figure 1B:
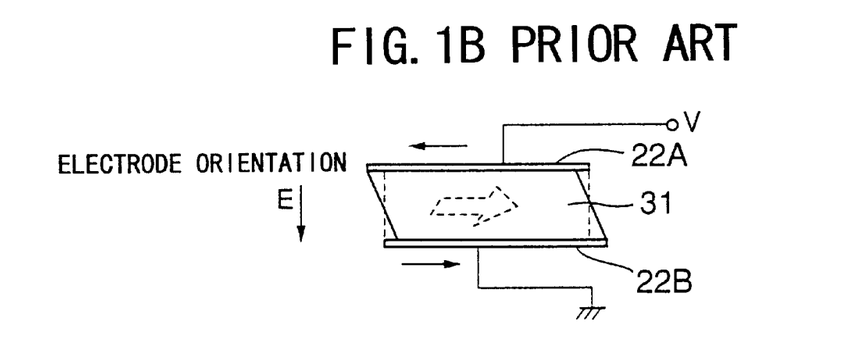

Accordingly, by supplying a voltage V to the electrode 22A in a state in which the electrode 22B is grounded, the side on which electrode 22A of the shear-type piezoelectric element 31 is disposed deflects from an original state shown by dotted lines in FIG. 1B to a left side while the electrode 22B side deflects to a right side. As a result, by fixing the electrode 22B side in place, the electrode 22A side deflects in a direction indicated by the dotted arrow in FIG. 1A. Additionally, in this state, if instead the electrode 22A side were to be grounded and a voltage V supplied to the electrode 22B, the electrode 22A side would deflect in a direction indicated by the solid arrow in FIG. 1A.

A fuller description of this type of piezoelectric element used as a micro-actuator in a conventional head drive device will now be given, with reference to FIGS. 2A and 2B. A head drive device 58 comprises a fixing member 20 that acts as a base, a driving member 30 disposed atop the fixing member 20, and a movable member 40 positioned atop the drive member 30. The fixing member 20 corresponds to the main arm described above, the movable member 40 corresponds to the sub-arm described above, and the driving member 30 corresponds to the micro-actuator described above.

Figures 2A, 2B:
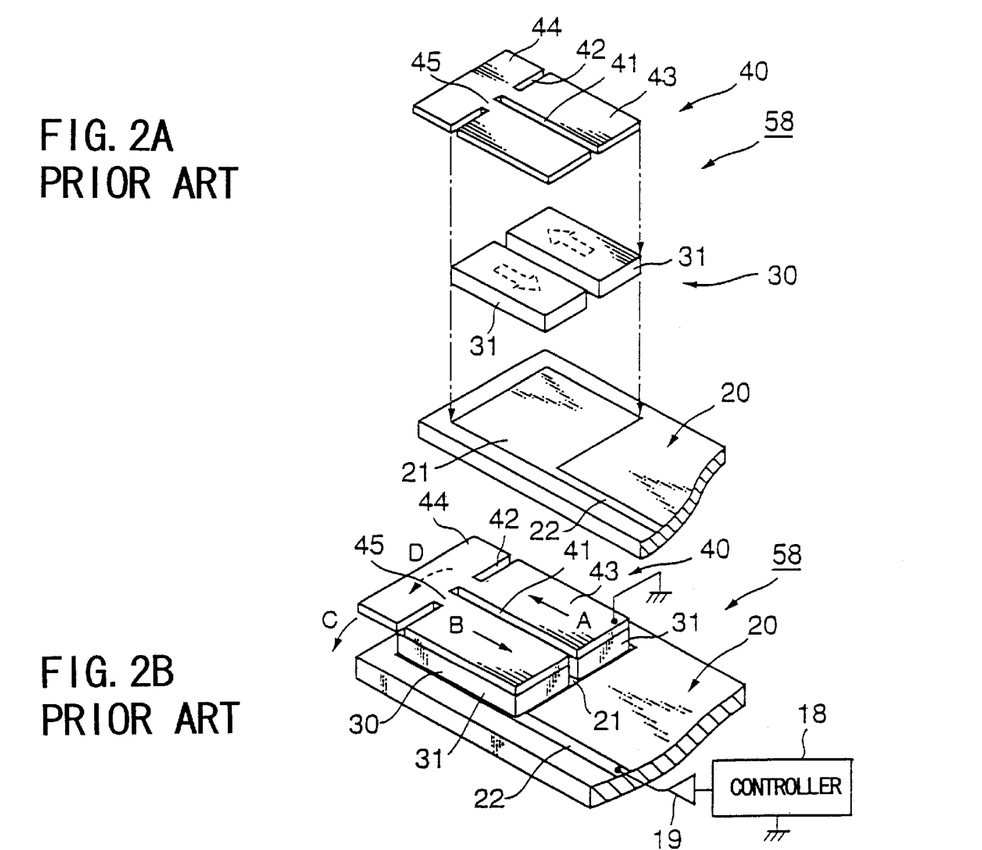
FIGS. 2A and 2B are diagrams showing exploded and assembled views, respectively, of a head drive device employing a conventional suspension drive.

As shown in FIGS. 2A and 2B, an electrode 21 is disposed atop the fixing member 20, and is connected to a voltage generating part not shown in the diagram by a lead pattern 22. The driving member 30 comprises two piezoelectric elements 31 arranged in parallel. The directions of polarization of the two piezoelectric elements 31 that form the driving member 30 are as indicated by dotted-line arrows, that is, perpendicular to a direction of a thickness of the piezoelectric elements and exact opposites of each other. The movable member 40 stacked atop the driving member 30 is composed of an electrically conductive metal. The movable member 40 comprises a base portion 43 that rests directly on the two piezoelectric elements 31 and a movement expansion portion 44 (hereinafter extension 44) that projects from the base portion 43, with a first notch 41 cut into the base portion 43 so as to divide the base portion 43 into two. The first notch 41 lies in a direction parallel to the direction of polarization of the two piezoelectric elements 31 of the driving member 30. Further, a pair of second notches 42 are cut into a boundary portion between the base portion 43 of the movable member 40 and the extension 44 at both sides of the driving member 40, the second notches 42 being formed in a direction perpendicular to the direction in which the first notch 41 is formed. A hinge 45 is formed between a tip of the first notch 41 and tips of the second notches 42.

FIG. 2B shows the head drive device 58 and actuator 52 of FIG. 2A in an assembled state. The electrode 21 of the fixing member 20 is connected to a controller 18 via an amplifier 19, in such a way that the movable member 40 and the controller 18 are grounded. Accordingly, when a drive signal of a predetermined polarity is output from the controller 18, this signal is amplified by the amplifier 19 and a predetermined voltage is supplied across the thicknesses of the two piezoelectric elements 31, causing the movable member 40 to shift in the direction of the dotted arrow.

As a result, the movable member 40 (head suspension) shown in FIGS. 2A and 2B is moved slightly by driving the piezoelectric elements 31 (the micro-actuator) at the tip of the fixing member 20 (the main arm), so the head fixedly mounted at the tip of the head suspension can be precisely positioned, thus forming a head drive device.

However, in the above-described head drive device, when the micro-actuator is driven so as to position the head, the drive reactive force and the inertia created by the movement of the center of gravity of the head suspension generates a vibrational force that excites the carriage and causes the arm to vibrate. In that event, then no matter how high the resonance frequency of the micro-actuator, the flexural mode of the arm appears together with the driving of the micro-actuator. The cycle of that flexural mode is the main resonance frequency as determined by the servo band, resulting in an inability to precisely position the head.

Accordingly, it is necessary to avoid exciting the arm when driving the micro-actuator in order to be able to position the head precisely.

One solution to this problem has been proposed by Japanese Laid-Open Patent Application No. 9-161425, in which the head is supported by a low-rigidity spring and the center of gravity is identical to the center of rotation of the arm, such that a relatively small force suffices to drive the micro-actuator.

However, in such a head drive device, the primary resonance frequency is a relatively low several hundred Hz, such that antiresonance shows up in the transfer function of the voice coil motor-driven head displacement, making accurate control difficult.

Another, more basic solution to the problem of head vibration is to reduce the mass of the head drive device. However, restrictions imposed by the shape of the head suspension and so forth limit the amount by which the mass of the head drive device can be reduced.

BRIEF SUMMARY OF THE INVENTION

Accordingly, it is an object of the present invention to provide an improved and useful magnetic head drive device in which the above-described disadvantage is eliminated.

The above-described object of the present invention is achieved by a head drive device for positioning a read and/or write head for reading and/or writing information to and from a disk coated with a recording medium, the head drive device comprising:
- a carriage;
- a main actuator for moving the carriage;
- a plurality of heads for reading and/or writing information to and from the disk; and
- a vibration control portion comprising a plurality of micro-actuators positioned between the carriage and the heads,
- such that when the main actuator and a first micro-actuator are driven to enable precise positioning of a desired head with respect to a surface of the disk a second micro-actuator is driven so as to cancel vibrations generated at the carriage by the operation of the desired micro-actuator.

According to this aspect of the invention, eliminating the vibrations generated by the first micro-actuator improves the precision with which the head can be positioned with respect to the disk, providing a head drive device capable of the precise positioning required with the narrow track widths of high-density recording.

Other objects, features and advantages of the present invention will become more apparent from the following detailed description when read in conjunction with the accompanying drawings.

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

Figure 3A:
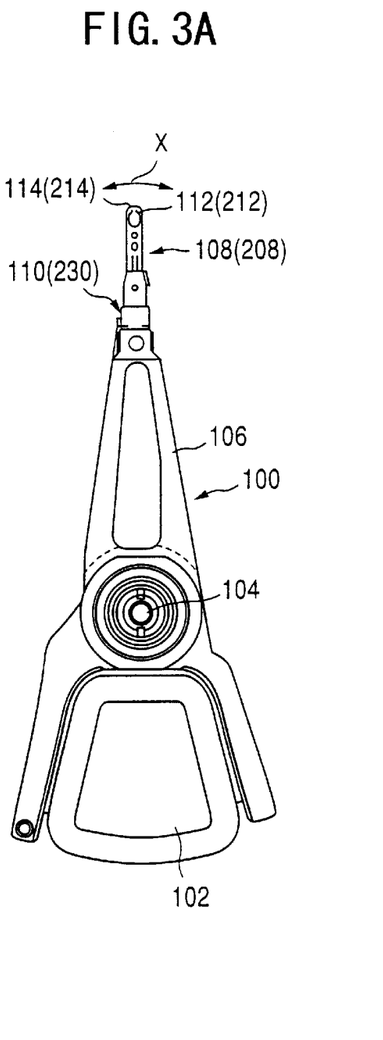
FIGS. 3A and 3B are diagrams showing the composition of a head carriage mounting a micro-actuator-equipped head drive device.
Figure 3B:
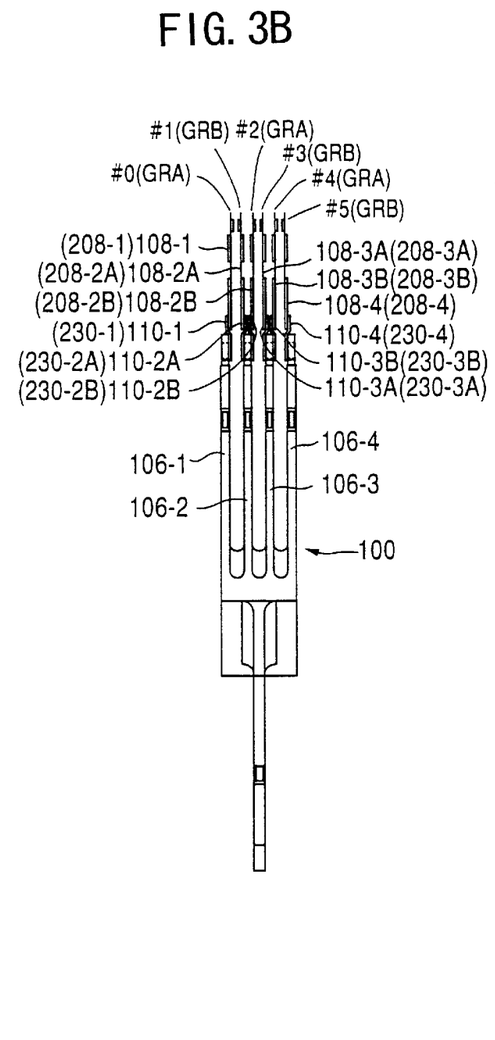

FIGS. 3A and 3B are diagrams showing plan and side views, respectively, of the composition of a head carriage mounting a micro-actuator-equipped head drive device.

As shown in FIG. 3A, the head carriage 100 is rotatable about a pivot or shaft 104 employing a VCM 102 as a main actuator. A main arm 106 projects outward from the shaft 104 on a side opposite the VCM 102. A sub-arm 108 is connected to a tip of the main arm 106, with a head 114 fixedly mounted on a tip of the sub-arm 108.

It should be noted that, in the following description, the main arm 106 is referred to simply as the arm 106, with the sub-arm 106 referred to as the head suspension 108.

The arm 106 and the head suspension 108 are connected to each other by a shear-type piezoelectric element 110 which acts as a micro-actuator. Accordingly, when the piezoelectric element 110 generates a displacement along a shear direction, the head suspension 108 undergoes a precise displacement over a limited range in a direction indicated by an arrow X in FIG. 3B. A head 114 is fixedly mounted at a tip of the head suspension 108 via a slider 112.

As can be seen in FIG. 3B, which presents a side view of the carriage 100, the arm 106 has a four-tiered structure, including an uppermost arm 106-1, intermediate arms 106-2 and 106-3, and a lower arm 106-4.

Head suspensions 108-1 and 108-4 are connected to the upper arm 106-1 and the lower arm 106-4, respectively. A piezoelectric element 110-1 is then connected between the uppermost arm 106-1 and the head suspension 108-1. Similarly, another piezoelectric element 110-4 is provided between the lower arm 106-4 and the head suspension 108-4. A single head suspension is thus connected to each of the upper arm 106-1 and the lower arm 106-4, with a single head fixedly mounted at a tip of the head suspension.

At the same time, two head suspensions are connected to each of the intermediate arms 106-2 and 106-3. That is, head suspensions 108-2A, 108-2B are connected to arm 106-2, and head suspensions 108-3A and 108-3B are connected to arm 106-3.

The above-described configuration is necessitated by the fact that recording surfaces are provided on both sides of the rotary disks that comprise the recording media used in such devices, so that the four-tiered arm structure of the carriage 100 shown in FIGS. 3A and 3B is capable of accommodating three disks.

In order to better facilitate an understanding of the present invention, the individual head suspensions 108 and the heads 114 fixedly mounted thereto are given reference numerals #0–#5 in FIG. 3B.

As described above, in order to precisely position the head at a predetermined track on the surface of the disk, the present invention seeks to minimize the vibrational force generated when one of two piezoelectric elements 110 (micro-actuator) is driven, the carriage 100 is excited and the carriage in-plane mode excited by driving the other piezoelectric element 110 in a direction opposite to and at an amplitude identical to that of the direction and amplitude in which the first piezoelectric element 110 is driven.

In other words, the present invention is based on the realization that the vibrations that disrupt precise positioning of the head relaative to the surface of the didk can be prevented from arising by driving the other of the piezoelectric element 110 attached to the same arm at the same amplitude as the first piezoelectric element 110 but at a phase offset (by for example 180°).

The dual actuator configuration shown in FIGS. 3A and 3B is essentially unchanged from the conventional art. However, as described above, the present invention differs from the conventional art insofar as when one of a pair of micro-actuators is driven the other of the pair of micro-actuators is driven at the same amplitude but opposite phase of the first micro-actuator, thereby canceling out the vibrational force generated by the movement of the first micro-actuator.

Viewed in terms of conventional head drive device drive control, the dual-actuator configuration shown in FIGS. 3A and 3B has an equation of motion of the arm 106 and micro-actuator (piezoelectric element) 110 which, when taking damping into account, is as (1) and (2) below:

$$I_a\theta_1 + m_m l_a^2 \theta_1 + m l_a l_{gm} \theta_2 + (c_1+c_2)\theta_1 - k_2\theta_2 + (k_1-k_2)\theta_1 - k_2\theta_2 = Fr - T \quad (1)$$

$$I_m\theta_1 + m_m l_a l_{gm}\theta_1 + c_2(\theta_2-\theta_1) + k_2(\theta_2-\theta_1) = T \quad (2)$$

In formula 1, the third term on the left side of the equation is the inertial force generated by the movement of the center of gravity of the movable portion of the micro-actuator (the head suspension 108). Additionally, the second term on the right side of the equation is the reaction force generated by driving a micro-actuator. In addition to the voice coil motor drive force Fr, the arm is also exposed to this drive force reaction and, as a result, the arm flexural mode is easily excited.

Figure 4A:
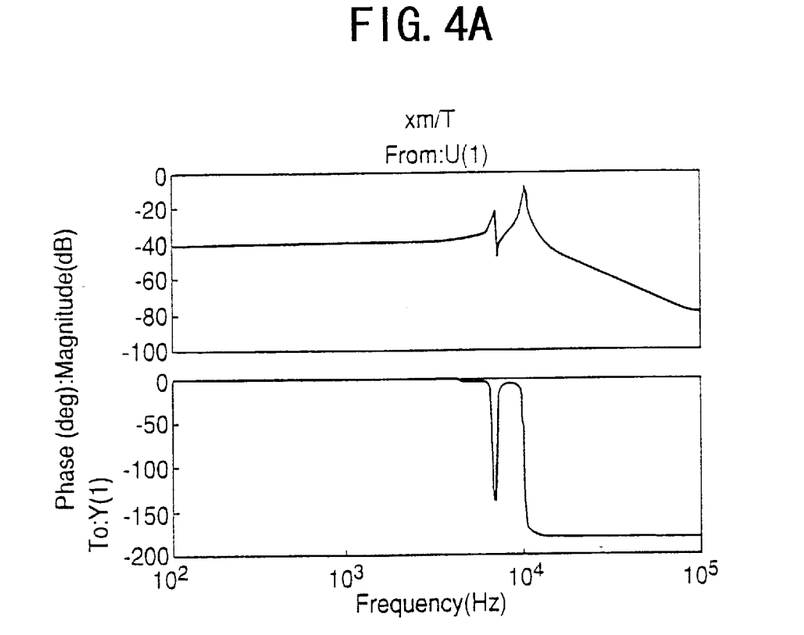
FIGS. 4A and 4B are graphs showing micro-actuator drive voltage versus head displacement frequency response function for the conventional head drive device and the head drive device according to the present invention, respectively.
Figure 4B:
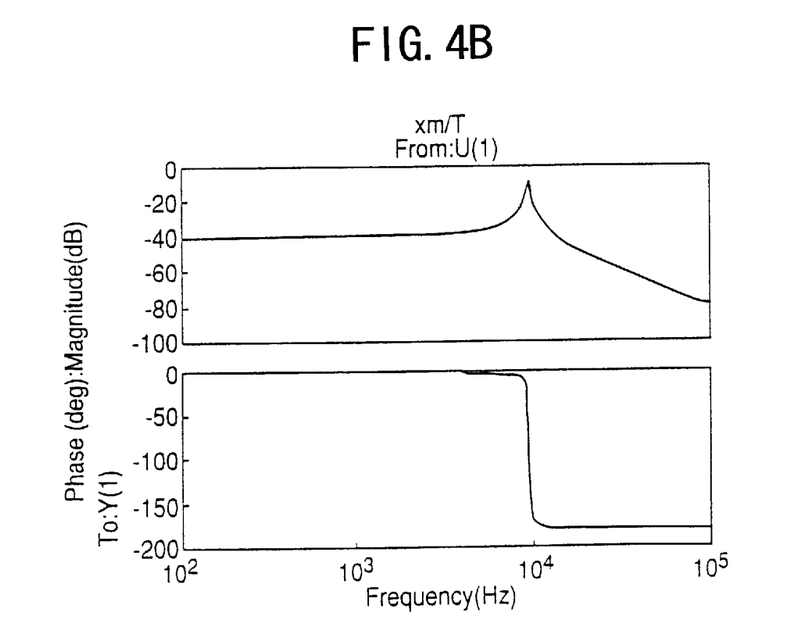

FIGS. 4A and 4B are graphs showing micro-actuator drive voltage versus head displacement frequency response function for the conventional head drive device and the head drive device according to the present invention, respectively.

For example, if the micro-actuator resonance frequency is 10 kHz and the arm flexural mode is 7 kHz, the micro-actuator drive voltage versus head displacement frequency response function is as shown in FIG. 4A. That is, a peak appears prior to the peak at $10^4$ Hz, indicating the presence of a vibration, which is of course undesirable.

By contrast, the drive state of the micro-actuator of the head drive device according to the present invention shows that the equations of motion for the arm 106 and the micro-actuator (piezoelectric element) 110 are as follows:

$$I_a\theta_1 + 2I_m\theta_1 + c_1\theta_1 + k_1\theta_1 = Fr \quad (3)$$

$$I_a\theta_{2r} + c_2\theta_{2r} + k_2\theta_{2r} = T \quad (4)$$

As can be seen from equations (3) and (4), the angle of rotation of the arm is affected by neither the angle of rotation of the micro-actuator $\theta_2$ nor the drive force T. Moreover, the micro-actuator is also unaffected by the angle of rotation of the arm $\theta_1$. Accordingly, the effects of the vibrational mode of the arm are avoided and the micro-actuator can function effectively in precisely positioning the head with respect to a desired track.

As described above, FIG. 4B shows the micro-actuator drive voltage versus head displacement frequency response function for the head drive device according to the present invention. Unlike with the conventional head drive device, in the head drive device according to the present invention the arm flexural mode does not arrive, and the 7 kHz mode does not appear and it can be confirmed that no peak occurs until the micro-actuator resonance frequency.

It should be noted that, although the above description involves eliminating vibrations arising at the time the micro-actuator (piezoelectric element) 110 mounted on one arm is driven, the present invention is not limited to such an embodiment. Thus, the present invention is also applicable to a case in which two micro-actuators diametrically disposed opposite each other are joined together by a structure of predetermined rigidity. In other words, the present invention is not necessarily limited to an arrangement in which a pair of micro-actuators are disposed on the same arm, provided that the micro-actuators are so situated with respect to each other that the driving of one of them in a direction opposite that of the other cancels out the vibrations arising when the first micro-actuator is driven. Thus, for example, the upper and lower micro-actuators described above, provided they are situated symmetrically at a central position, can be driven so that the vibrations created by the one micro-actuator can be cancelled out by the operation of the other micro-actuator. With reference to FIGS. 3A and 3B, the micro-actuators that drive the head #0 and the head #5, respectively, satisfy the above-described relation.

Further, by forming a second group including micro-actuators disposed so as to cancel out a vibrational force of each of the micro-actuators within a first group (including micro-actuators actually subjected to drive control), vibrations can be eliminated by group. Forming the micro-actuators into groups as thus described eliminates the need to provide dedicated drive circuits for each and every micro-actuator, thereby simplifying circuit composition.

It should be noted that any two micro-actuators each positioned so as to cancel out the vibrations generated by the other need not be driven in particular directions. Provided that the two micro-actuators are driven in opposite directions, there are no particular additional configurational limitations. The drive voltages of the two micro-actuators can be controlled by firmware or by amplifier as necessary in order to generate opposed drive voltages. Conversely, the two micro-actuators can be disposed so as to operate or deflect in opposed directions, and can thus be driven by identical voltages.

A description will now be given of a head drive device according to a first embodiment of the present invention, with reference to the drawings. Since, as described above, the present invention concerns micro-actuator drive control, the description references a basic head drive device hardware configuration like that shown in FIGS. 3A and 3B.

Figure 5:
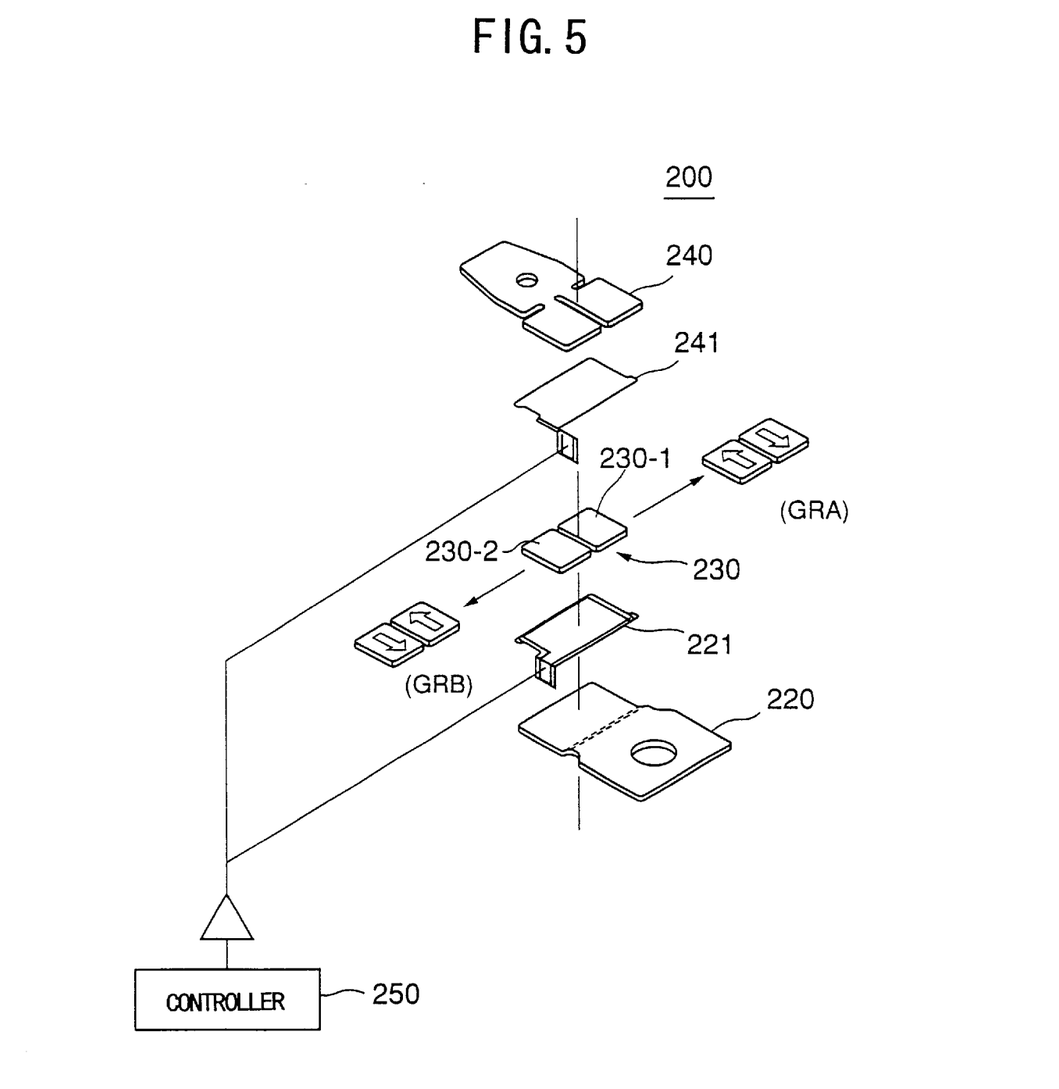
FIG. 5 is a diagram showing an expanded perspective view of essential parts of a head drive device according to a first embodiment of the present invention.
Figure 6A:
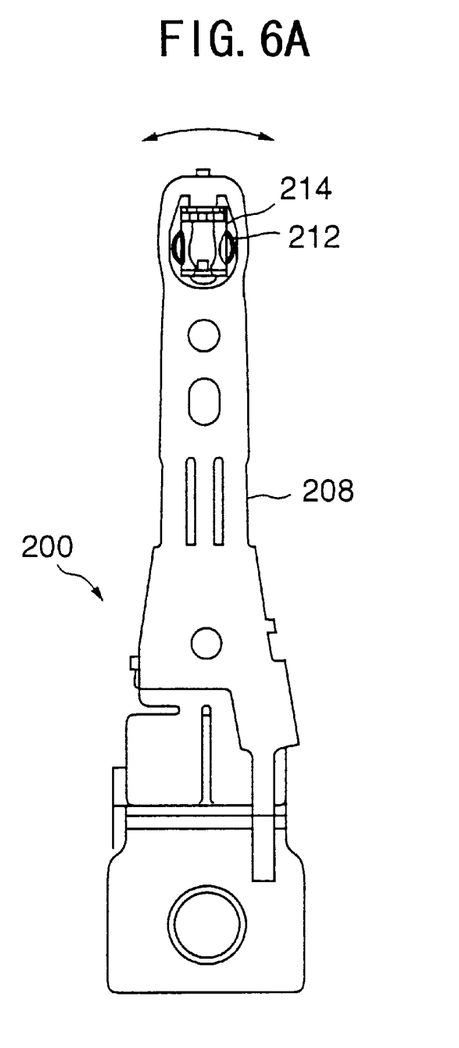
FIGS. 6A and 6B are plan and side views of a head drive device according to a first embodiment of the present invention, respectively.
Figure 6B:
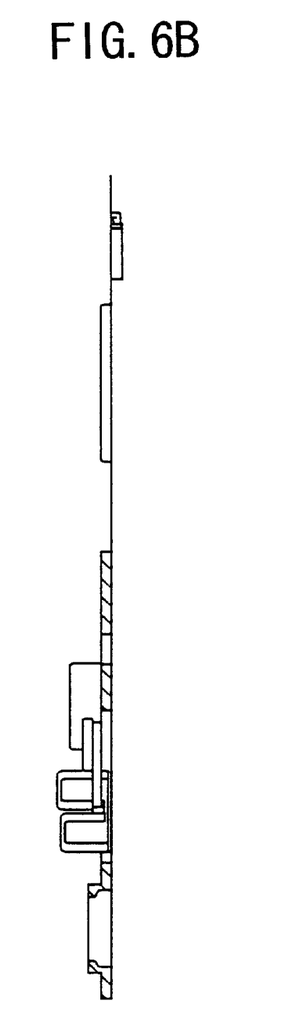

FIG. 5 is a diagram showing an expanded perspective view of essential parts of a head drive device according to a first embodiment of the present invention. FIGS. 6A and 6B are plan and side views of a head drive device according to a first embodiment of the present invention, respectively.

As shown in the diagrams, the head drive device 200 according to the present invention uses two shear-deflection-type piezoelectric elements as micro-actuators. The two piezoelectric elements 230-1 and 230-2 are disposed between a fixing member 220 that functions as the main arm and a movable member 240 that functions as the head suspension, via upper and low electrodes 241 and 221, respectively. By supplying a predetermined voltage between the electrodes 241 and 221, the two piezoelectric elements 230-1 and 230-2 deflect in different directions, causing the head suspension 208 mounted on the movable member 240 to vibrate. This type of configuration is fundamentally unchanged from the conventional art described with reference to FIGS. 1A, 1B, 2A and 2B.

However, unlike the conventional art, the head drive device according to the present embodiment is also provided with a controller 250, which, when a controlled piezoelectric element that positions the read and/or write head with respect to a track on a disk is driven, drives another piezoelectric element so as to cancel out a vibrational force generated by the driving of the first piezoelectric element.

A description will now be given of the actual operation of the head drive device shown in FIG. 5, in this case with reference to the four-arm carriage 100 shown in FIGS. 3A and 3B.

A description will first be given of the drive control for the piezoelectric elements 230 shown in FIGS. 3A and 3B. The piezoelectric elements 230 are of two types as is shown in FIG. 5, that is, are of different polarities indicated as GRA and GRB, both of which are operated at approximately the same time so as to be able to cancel out the vibrations.

For example, the controller 250 drives the piezoelectric element 230-2A when positioning the #1 head, but drives the piezoelectric element 230-2B belonging to the #2 head in reverse. By operating the piezoelectric elements on a given arm in pairs, the vibrations generated by precision movement of the #1 head can be effectively cancelled out by the reverse movement of the #2 head.

It should be noted that the #1 head and the #2 head are each connected to the intermediate arm 106-2 via the head suspensions 208-2A and 208-2B, respectively, which is preferably symmetrical in a direction of a width of the intermediate arm 106-2.

At the same time, the upper head #0 and the lower head #5 are configured such that only one piezoelectric element is disposed on one arm, in which case the one of the pair of piezoelectric elements whose movement cancels out the vibrations caused by the operation of the other piezoelectric element is not provided on the same arm as is the case with respect to the #1 and #2 heads described above. Nevertheless, the carriage 100 shown in FIGS. 3A and 3B is symmetrical at a central position in a direction of a thickness of the carriage 100, such that the piezoelectric elements that are connected to the upper arm 106-1 and the lower arm 106-4 and which are operated to position the upper #0 head and the lower #5 head, when operated as a pair, can achieve the vibration-canceling effect of the #1 and #2 heads described above.

In other words, even if the carriage arm is a multi-tiered structure, the present invention is still applicable provided the carriage is symmetrical about a central point in a direction of a thickness of the carriage.

As described above, the controller 250 deploys a pair of piezoelectric elements for the intermediate arms 106-2, 106-3 as well as for the uppermost and lowermost arms in order to offset the vibrations generated by operation of the controlled piezoelectric element.

In the head drive device according to the first embodiment of the present invention, the pair of piezoelectric elements used are formed so as to operate in different directions GRA and GRB. In this case, the controller 250 changes the direction of the voltage depending on whether the head to be controlled is an odd-numbered head or an even-numbered head. For example, when the #1 head is used for reading and/or writing, the controller 250 activates the piezoelectric element belonging to that head, causing the #1 head to move, for example, to the left via the head suspension. At this time, the controller 250 also drives the #2 head piezoelectric element in the opposite direction (right) in order to offset the vibrations generated by moving the #1 head.

Figure 7:
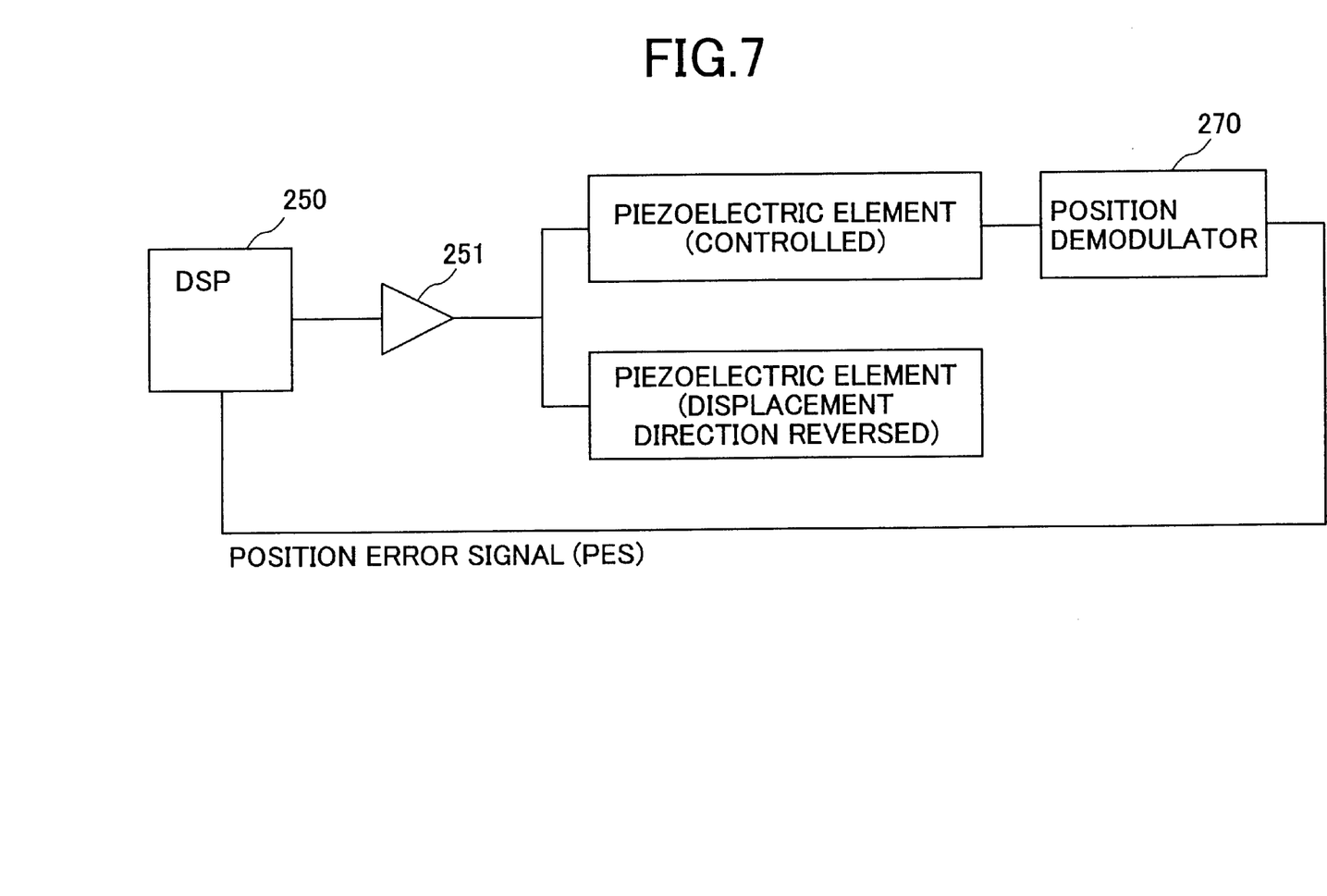
FIG. 7 is a block diagram of a control system for controlling the piezoelectric elements of the head drive device according to the first embodiment of the present invention in a case in which the pair of piezoelectric elements displace in opposite directions.

FIG. 7 is a block diagram of a control system for controlling the piezoelectric elements of the head drive device according to the first embodiment of the present invention in a case in which the pair of piezoelectric elements displace in opposite directions. The piezoelectric elements are calibrated so that their displacement with respect to a given voltage is approximately identical, with the corrective constant that sets the calibration stored in a memory device using a digital signal processor, or DSP, as the controller 250. By assigning a positive constant to the piezoelectric elements that drive even-numbered heads and a negative constant to the piezoelectric elements that drive odd-numbered heads in the routine that calculates the control voltage to be used, the orientation of the specified voltage to be supplied can be changed as necessary depending on the head via a driver 251.

Figure 8:
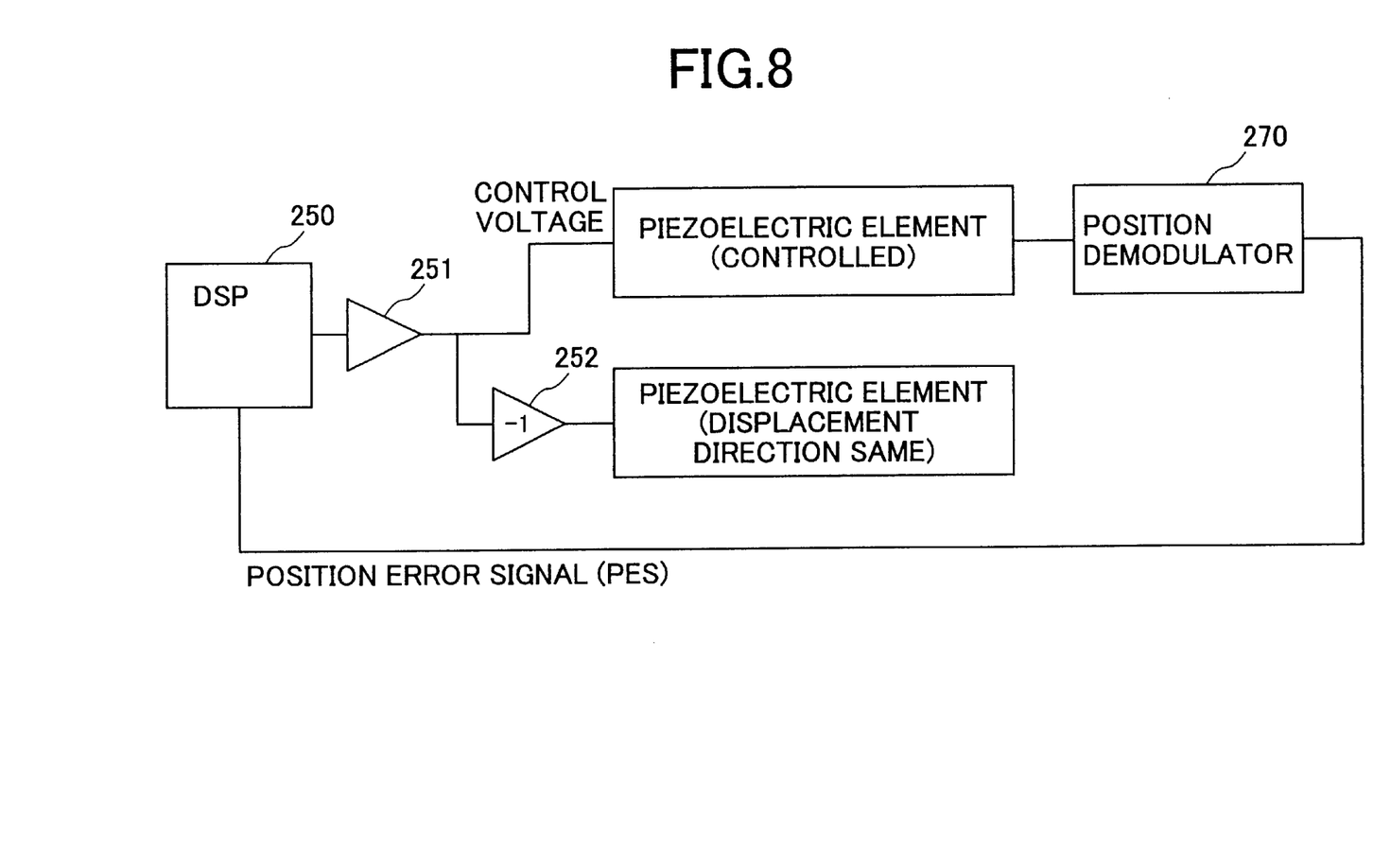
FIG. 8 is a first block diagram of a control system for controlling the piezoelectric elements of the head drive device according to a variation of the first embodiment of the present invention in a case in which the pair of piezoelectric elements displace in the same direction.

FIG. 8 is a first block diagram of a control system for controlling the piezoelectric elements of the head drive device according to a variation of the first embodiment of the present invention in a case in which the pair of piezoelectric elements displace in the same direction.

As shown in the diagram, the direction of polarization of the piezoelectric elements is, for example, the direction indicated as GRA in FIG. 5, so the specified voltage supplied to the controlled piezoelectric element from the driver 251 remains unchanged while the specified voltage destined for the piezoelectric element to be operated in reverse is multiplied by a factor of −1 by an amplifier 253. In such a structure it is possible to employ a configuration in which all the piezoelectric elements deflect in the same direction, with improved quality control and lower costs.

Figure 9:
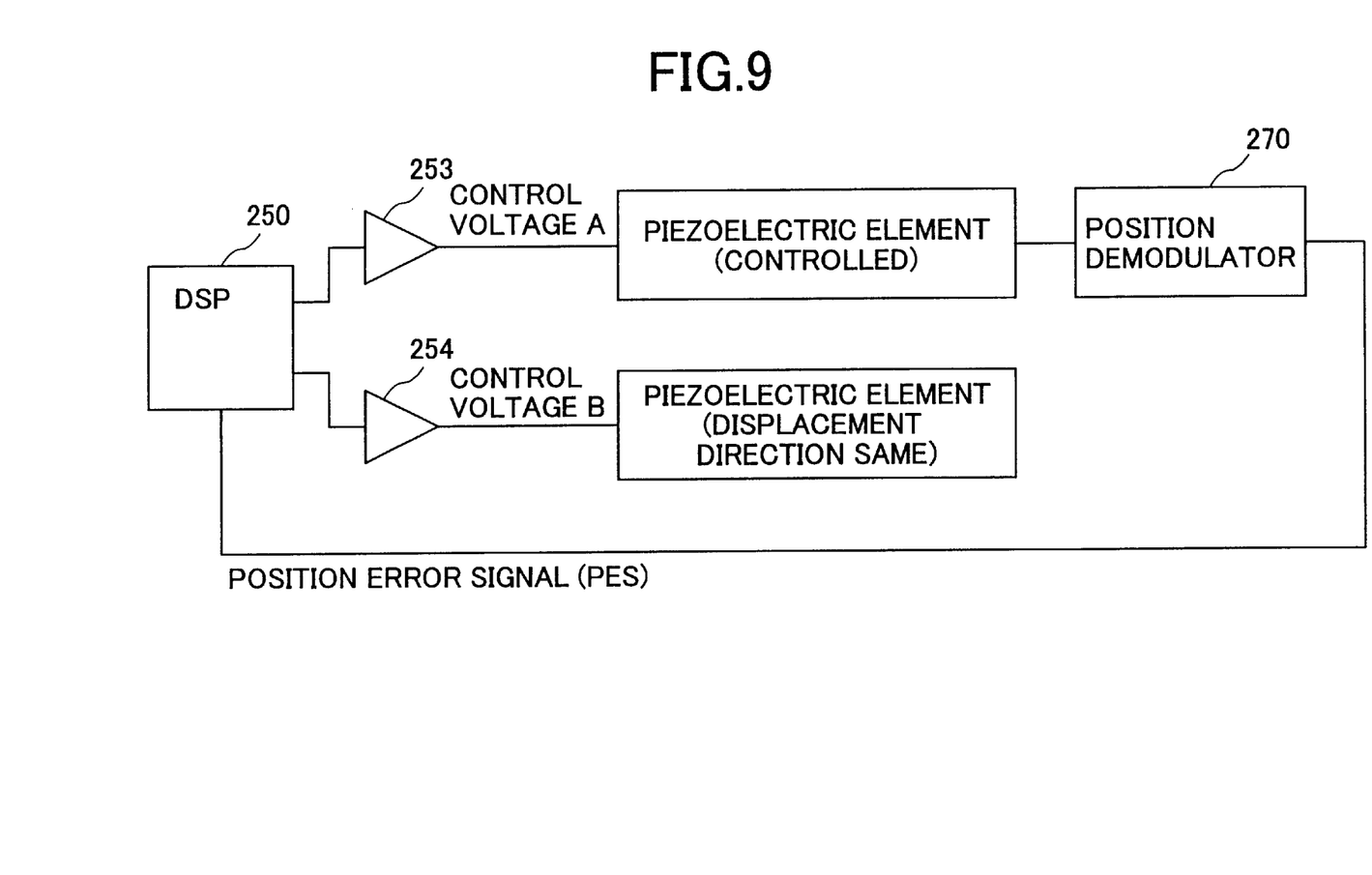
FIG. 9 is a second block diagram of a control system for controlling the piezoelectric elements of the head drive device according to a variation of the first embodiment of the present invention in a case in which the pair of piezoelectric elements displace in the same direction.

Further, the above-described variation of the first embodiment of the head drive device according to the present invention may be configured in the manner shown in FIG. 9. FIG. 9 is a second block diagram of a control system for controlling the piezoelectric elements of the head drive device according to a variation of the first embodiment of the present invention, in a case in which the pair of piezoelectric elements displace in the same direction.

As can be appreciated, the difference between the configurations shown in FIG. 8 and FIG. 9 is that the latter configuration supplies the specified voltage to the piezoelectric elements via two separate drivers 253, 254, that is, one driver for each piezoelectric element, whereas in the former configuration there is only the one driver 251. Nevertheless the same precise positioning of the head with respect to the surface of the disk can be obtained in the latter configuration as in the former.

It should be noted that the position demodulator indicated by reference number 270 supplies a position error signal to the controller 250 based on the position data inscribed on the surface of the disk so as to enable the head to be precisely positioned with respect thereto.

As described above, in the first embodiment (and variations thereof), the operation of the pair of piezoelectric elements is controlled by the controller 250 in such a way as to cancel any vibrations caused by the operation of one of the pair of piezoelectric elements. Additionally, the block diagrams of FIGS. 7, 8 and 9, though illustrative of a configuration involving a pair of piezoelectric elements, are representative of the circuit structure of all piezoelectric elements used to drive suspension heads, with control exerted by the controller 250.

A description will now be given of a magnetic head drive device according to a second embodiment of the present invention.

It will be noted that the magnetic head drive device according to the first embodiment of the present invention as described above operated a pair of symmetrically disposed piezoelectric elements in such a way that the vibrations caused by the operation of one of the pair of piezoelectric elements is cancelled out and eliminated by the operation of the other of the pair of piezoelectric elements.

However, in order for such an arrangement to work effectively, a minimum necessary condition is that the drive state of the piezoelectric elements be maintained so that the #0 and #5 heads, the #1 and #2 heads, and the #3 and #4 heads always form a pair. In other words, when the #0 head is used for reading and/or writing, the piezoelectric element connected to the #0 head is the one directly operated by the controller while the piezoelectric element connected to the #5 head is driven in reverse in order to cancel out the vibrations generated by the operation of the piezoelectric element connected to the #0 head. At the same time, however, the piezoelectric elements connected to the #1 head and the #2 head may also be driven so that each cancels out vibrations generated by the operation of the other.

Accordingly, it is thus possible to form the #0, #2 and #4 heads into a first group of piezoelectric elements all driven at the same time and to form the #1, #3 and #5 heads into a second group of piezoelectric elements all driven at the same time, so that one group includes piezoelectric elements controlled directly and the other group includes piezoelectric elements driven so as to cancel out vibrations generated by the operation of the first group.

Figure 10:
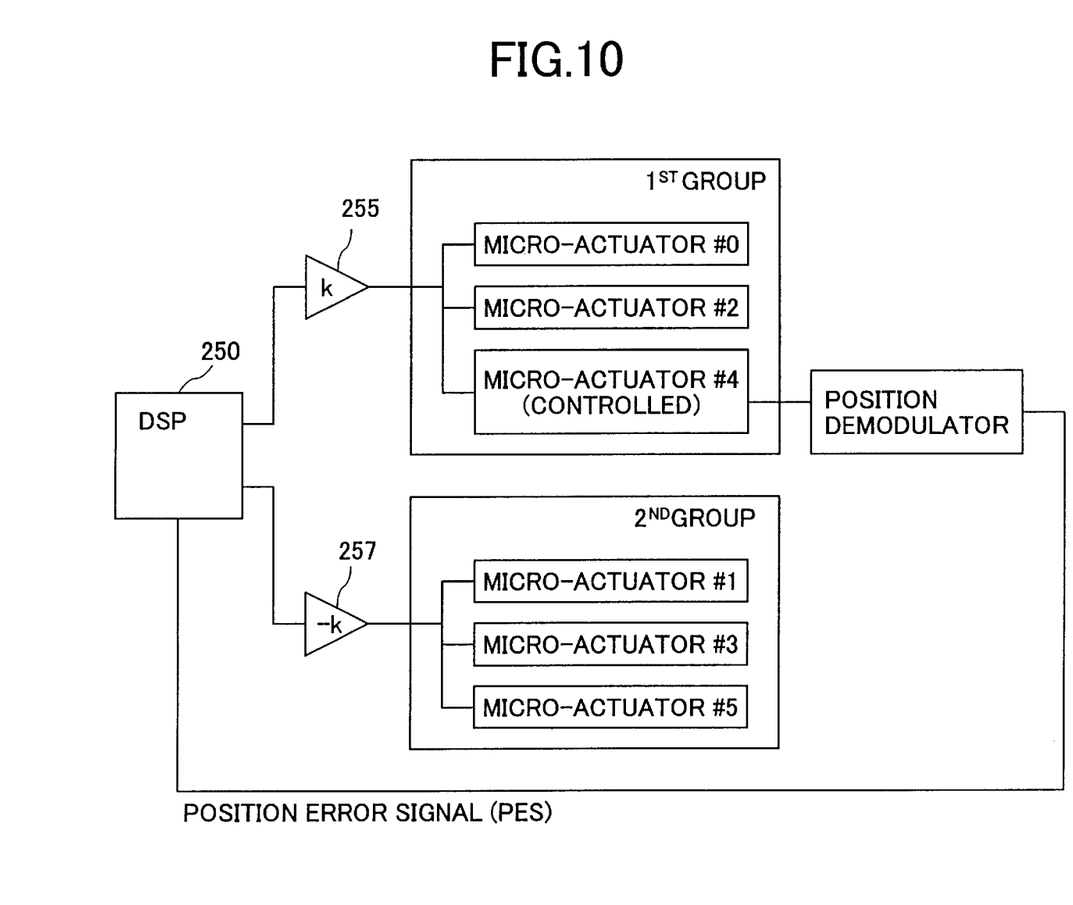
FIG. 10 is a block diagram of a control system for a head drive device according to a second embodiment of the present invention.

FIG. 10 is a block diagram of a control system for a head drive device according to a second embodiment of the present invention.

The configuration shown in FIG. 10 is one that groups together into first and second groups all those piezoelectric elements of the first embodiment shown in FIG. 8 that are set to deflect in the same direction. By providing two dedicated drivers 255, 257 to drive the first and second groups, respectively, the processing program employed by the controller to control the operation of the piezoelectric elements can be simplified. It should be noted that, in the same manner as in the configurations shown in FIGS. 8 and 9, in which all the piezoelectric elements are polarized in the same direction, the piezoelectric elements may be simply divided into two groups and thus there is no need to produce two different types of piezoelectric elements, with the advantage of additional large cost reductions.

Figure 11:
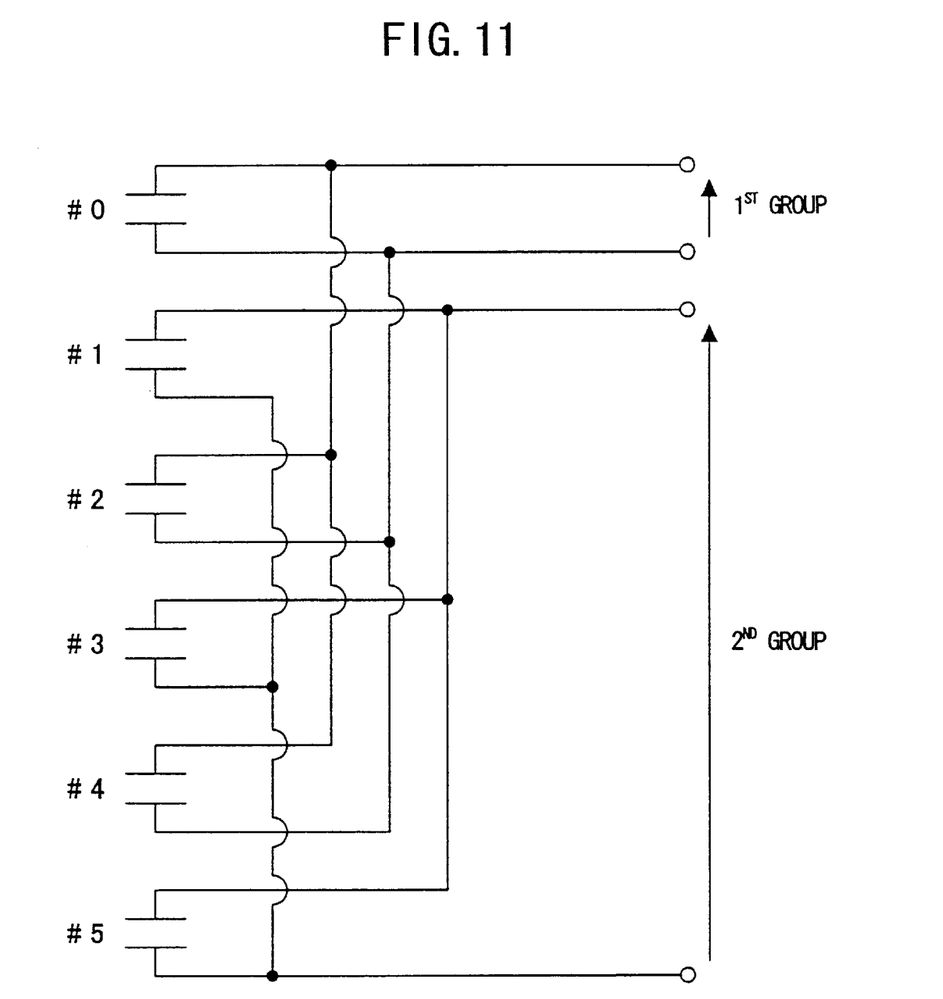
FIG. 11 is a diagram showing one configuration of circuit structure when the piezoelectric elements are divided into a first group and a second group.

FIG. 11 is a diagram showing one configuration of circuit structure when the piezoelectric elements are divided into a first group and a second group. As shown in the diagram, the #0, #2 and #4 heads form the first group and the #1, #3 and #5 heads form the second group.

It should be noted that although the first and second embodiments have been described with reference to a carriage having four arms, the present invention is not limited to such a case but can, for example, be applied as well to carriages having 5 or more arms.

Further, although the above embodiments have been described with reference to piezoelectric elements as the micro-actuators, the present invention is not limited to such a case but is applicable to any magnetic head drive device employing micro-actuators in which vibration is a problem.

A description will now be given of a hard disk drive unit employing the above-described head drive device according to the present invention.

Figure 12:
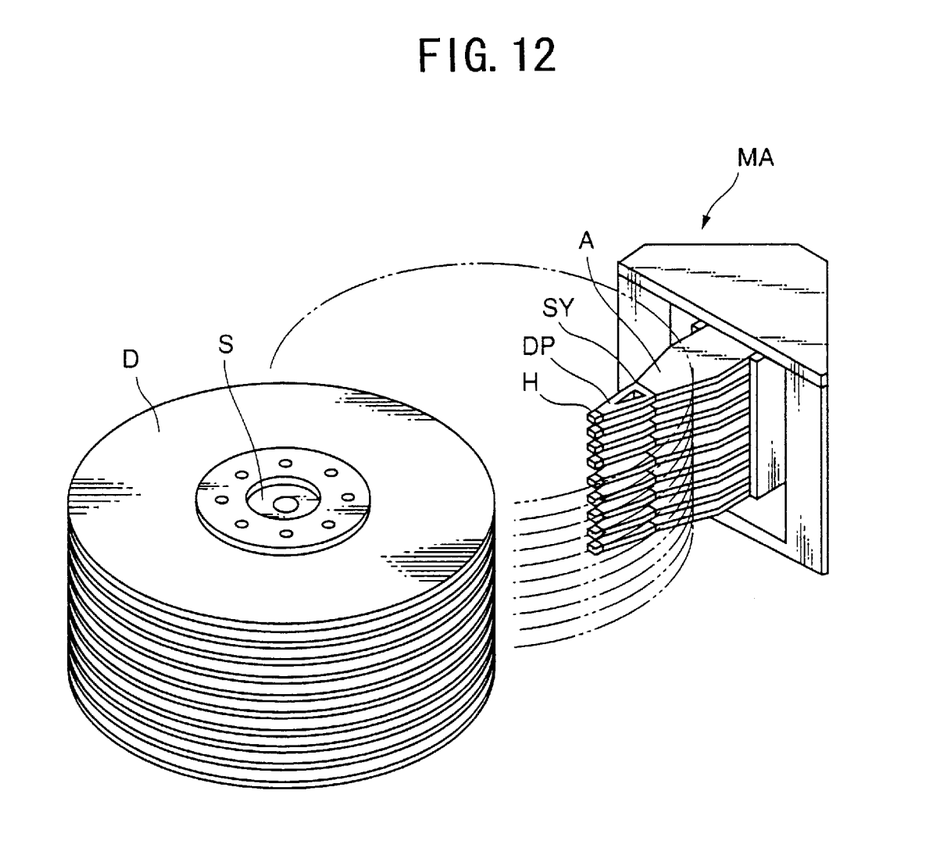
FIG. 12 is a diagram illustrating the use of the head drive device according to the present invention in a hard disk drive unit.

FIG. 12 is a diagram illustrating the use of the head drive device according to the present invention in a hard disk drive unit.

As shown in the diagram, the hard disk drive unit comprises a spindle S that rotates at high speed and a plurality of recording disks D mounted at set intervals on the spindle S. Information is recorded on both surfaces of the disk D, so information is written to or read from each one of the recording disks D by heads H provided on one or both sides of the disk D. The movement of these heads H over the surfaces of the disks D is conducted by the movement of an arm A and a dispense head DP, positioning a desired head along and above a desired track formed on the surface of the disk D. The arm A is driven as a body together with the main actuator MA, such that the dispense heads DP are individually finely positioned by small head drive devices SY employing micro-actuators. The magnetic head drive devices according to the embodiments described above can be used as the small head drive devices SY. In such a device, when a particular micro-actuator designated to move the head H is driven, another micro-actuator is always operated so as to cancel out the vibrations caused by the operation of the first micro-actuator, thus making it possible to provide a hard disk drive unit capable of precise positioning of the head without the disadvantage of vibrations as with the conventional art.

It should be noted that although the foregoing embodiments involve disposing the micro-actuator at the connection between the main arm and the head suspension (sub-arm), the present invention is not limited to these embodiments. Provided that the micro-actuators are disposed between the carriage and the head in such a way that the driving of a second micro-actuator so as to cancel out the vibrations caused by the operation of a first micro-actuator driven in order to perform precise positioning of the head, then the object of the present invention is achieved.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-268772, filed on Sep. 5, 2000, the contents of which are hereby incorporated by reference.

What is claimed is:

1. A head carriage assembly for use in a magnetic disk drive, comprising:
    a carriage rotatable about a rotational axis;
    a main actuator swinging said carriage;
    a magnetic head provided on said carriage, said magnetic head conducting reading and/or writing of information to and from a magnetic head; and
    a plurality of micro-actuators, including a first micro-actuator and other micro-actuators provided on said carriage;
    said first micro-actuator being driven so as to provide a movement to said magnetic head in addition to a swinging motion of said carriage caused by said main actuator,
    said other micro-actuators being driven so as to cancel a vibration caused by said first micro-actuator.

2. The head carriage assembly as claimed in claim 1, wherein said carriage includes a common hub rotating about said rotational axis and a plurality of arms, including a first arm and a second arm, connected mechanically to said common hub, said first arm carrying said magnetic head, said first micro-actuator being provided on said first arm, a second micro-actuator being provided on said second arm, said first and second arms being in a symmetric relationship with regard to a central height of said common hub in a direction of said rotational axis, said first and second micro-actuators being driven in respective, mutually reverse directions at an identical amplitude.

3. The head carriage assembly as claimed in claim 2, wherein said first arm is located at an end of said common hub and said second arm is located at the other end of said common hub.

4. The head carriage assembly as claimed in claim 2, wherein each of said first and second arms is formed of a main arm and an extension arm, said main arm and said extension arm are connected by said first micro-actuator in said first arm, said main arm and said extension arm are connected by said second micro-actuator in said second arm.

5. The head carriage assembly as claimed in claim 1, wherein said carriage includes a common hub rotating about said rotational axis and a plurality of arms, including a central arm, connected mechanically to said common hub, said central arm carrying said magnetic head and located at a central height of said hub in a direction of said rotational axis, said first arm carrying said first micro-actuator and a second micro-actuator included in said plurality of micro-actuators, said first and second micro-actuators being driven in respective opposite directions with an identical amplitude.

6. The head carriage assembly as claimed in claim 5, wherein said central arm is formed of a main arm and an extension arm, said main arm and said extension arm are connected by said first and second micro-actuators.

7. The head carriage assembly as claimed in claim 1, wherein said plurality of micro-actuators form a first group of micro-actuators including said first micro-actuator and a second group of micro-actuators, said first group of micro-actuators being driven collectively in a first direction with a first amplitude, said second group of micro-actuators being driven collectively in a second, opposite directions with a second amplitude identical with said first amplitude.

8. The head carriage assembly as claimed in claim 1, wherein each of said first group of micro-actuators is formed of a piezoelectric element having a first polarity, and each of said second group of micro-actuators is formed of a piezoelectric element having a second, opposite polarity.

9. The head carriage assembly as claimed in claim 1, wherein each of said first and second group of micro-actuators is formed of a piezoelectric element having an identical polarity, said piezoelectric elements of said first group of micro-actuators are driven collectively with a drive voltage of a first polarity, said piezoelectric elements of said second group of micro-actuators are driven with a drive voltage of a second, opposite polarity.

10. The head carriage assembly as claimed in claim 1, wherein each of said plurality of micro-actuators is formed of a piezoelectric element that causes a shear deformation upon application of a drive voltage.

11. A magnetic storage device, comprising:
    a rotary magnetic disk;
    a motor rotating said magnetic disk;
    a head carriage assembly carrying a magnetic head such that said magnetic head scans over a surface of said magnetic disk;
    wherein said head carriage assembly comprises:
        a carriage rotatable about a rotational axis and carrying said magnetic head;
        a main actuator swinging said carriage;
        said magnetic head conducting reading and/or writing of information to and from said magnetic head; and
        a plurality of micro-actuators, including a first micro-actuator and other micro-actuators provided on said carriage;
        said first micro-actuator being driven so as to provide a movement to said magnetic head in addition to a swinging motion of said carriage caused by said main actuator,
        said other micro-actuators being driven so as to cancel a vibration caused by said first micro-actuator.

* * * * *